United States Patent [19]

Kogane et al.

[11] 4,353,645

[45] Oct. 12, 1982

[54] NEGATIVE FILM CARRIER

[75] Inventors: Mikio Kogane; Seiichi Yamazaki, both of Minami-ashigara, Japan

[73] Assignee: Fuji Photo Film Co., Ltd., Kanagawa, Japan

[21] Appl. No.: 210,183

[22] Filed: Nov. 25, 1980

[30] Foreign Application Priority Data

Dec. 28, 1979 [JP] Japan ................ 54/182577[U]

[51] Int. Cl.³ .............................. G03B 27/62
[52] U.S. Cl. ......................... 355/75; 352/225; 352/226
[58] Field of Search ............ 355/50, 51, 75; 352/79, 352/224, 225, 226

[56] References Cited

U.S. PATENT DOCUMENTS

| | | | |
|---|---|---|---|
| 2,246,971 | 6/1941 | Brenkert | 352/226 |
| 2,457,915 | 1/1949 | Nemeth | 352/226 |
| 3,604,328 | 9/1971 | Nakagawa | 355/75 |

FOREIGN PATENT DOCUMENTS 697977 11/1930 France ........................ 352/225
54-118830 9/1979 Japan .

Primary Examiner—L. T. Hix
Assistant Examiner—Alan Mathews
Attorney, Agent, or Firm—Sughrue, Mion, Zinn, Macpeak & Seas

[57] ABSTRACT

A negative film carrier for printing pictures including a carrier stand having an abutting and moving drive mechanism which is adapted to be rocked by a solenoid, a plurality of stationary frames of different image window sides which are interchangeably mounted on the carrier stand, and a plurality of abutting movable frames provided in correspondence with the stationary frames. The image window of each of the abutting movable frames has two parallel sides parallel to the direction of advancement of a negative film and a second pair of sides having a decreasing width in a direction perpendicular to the direction of advancement of a negative film. The second two sides may be formed arcuately or each may be two sides of an overall hexagonal window frame.

5 Claims, 6 Drawing Figures

NEGATIVE FILM CARRIER

BACKGROUND OF THE INVENTION

The present invention relates to negative film carriers for holding negative films in photographic pictures. More particularly, the invention relates to a movable frame in such a negative film carrier which is provided with an image window suitable for stably feeding a relatively short negative film which has been curled.

A negative film carrier should be able to set a frame of a negative film flat at a predetermined position, to quickly insert and move a negative film, and to automatically stably feed a relatively short negative film such as a segment of negative film having two to six frames. Accordingly, a negative film carrier for reprinting pictures from segments of negative films should be able to suitably depress a negative film against the image window for maintaining the frames of the negative film flat and to stably feed a segment of negative film along the film rail.

FIGS. 1 and 2 are a plan view and a sectional view, respectively, showing an example of a conventional negative film carrier of the type disclosed in Japanese Laid-Open Utility Model Application No. 118830/1979. In the example, the negative film carrier 1 includes a carrier stand 10, a stationary frame 20 and a depressing or abutting movable frame 30. The carrier stand 10 is provided with an abutting and drive mechanism having a drive lever 14 which is rocked around a fulcrum structure 13 by a driving solenoid 11 and abutting solenoids 12, an opening 15, adjusting device 16, and positioning protrusions 17. The fulcrum structure 13 is provided with a spring 19 which urges the drive lever in the direction of abutment.

The stationary frame 20 has an image window whose size corresponds to an image frame size, a guide groove 22 for introducing a negative film to the image window, and mounting holes 23.

The abutting movable frame 30 is made up of an engaging holder 31 and an image window frame 32. The image window frame 32 has four pins 33 at four corners thereof. Four springs 34 are disposed around the pins 33 with the pins 33 being connected to the engaging holder 31. That is, the image window frame 32 is elastically coupled to the engaging holder 31.

A different stationary frame 20 is provided for each available negative film frame size. However, any of the various stationary frames 20 can be mounted on the carrier stand 10 by engaging the positioning protrusions 17 with the mounting holes 23 formed in the bottom of the stationary frame 20 so that the image window 21 is in alignment with the opening 15.

Similarly, a number of different abutting movable frames 30 are provided the size of the image windows 38 of which differ in size according to the available negative film frame sizes. However, each of the various abutting movable frames 30 can be coupled to the drive lever 14 by engaging positioning slots 35 formed in the engaging holder 31 with positioning pins 18 which are rigidly coupled to the drive lever 14 of the carrier stand 10 and by tightening a screw 40 in a mounting slot 36 formed in the engaging holder 31.

The adjusting device 16 is used to adjust the pressure of one edge 37 of the image window frame 32 which is exerted on the stationary frame 20 when the abutting movable frame 30 is moved. The adjusting device 16 is made up of a protruding pin 41, a biasing spring 42 and an adjusting screw 43. The protruding pin 41 pushes up the drive lever 14 with the biasing force of the spring 19. The biasing force of the protruding pin 41 can be adjusted by operating the adjusting screw 43.

In the conventional negative film carrier thus constructed, during a printing operation the abutting movable frame 30 abuts against the negative film. After the printing operation, the movable frame 30 is turned upwardly around the fulcrum structure 13 and the next frame of the negative film is set at the predetermined printing position. More specifically, the segment of negative film is moved in the direction of the arrow a (FIG. 1) along the guide groove 22 which is formed in the stationary frame 20 to guide the negative film. If, in this case, the negative film is curled to have an arcuate cross section, then the following difficulty occurs. Since the image window 38 of the movable frame 30 is rectangular, when the end of the segment of negative film reaches the printing position, the end of the negative film is caught by one edge 38' of the image window 38 due to the curl in the film. That is, in this case, the advancement of the negative film is stopped. This will become more apparent by referring to FIG. 3 which shows the arcuate negative film abutting against the movable frame's image window. As is seen in FIG. 3, the segment of negative film 40 is caught by the edge 38' of the image window 38 because the edge 38' is perpendicular to the direction of advancement of the segment of negative film 40.

Accordingly, an object of the present invention is to provide a movable frame for a negative film carrier in which all of the above-described difficulties have been eliminated and segments of curled negative film can be stably fed.

SUMMARY OF THE INVENTION

The foregoing object and other objects of the invention have been achieved by shaping the image window of the movable frame, which confronts the image window of the stationary frame, in such a manner that it has no side which is substantially perpendicular to the direction of advancement of a negative film and so that it has a pair of opposed sides which are connected to a second pair of opposed sides so as to form an obtuse angle therebetween. The second pair of opposed sides are symmetrical with respect to the direction of advancement of a negative film.

More specifically, these and other objects of the invention are met by a negative film carrier for printing pictures including a carrier stand having an abutting and moving drive mechanism which is adapted to be rocked by solenoid means, a plurality of stationary frames of different image window sides with the frames being interchangeably mountable on the carrier stand, and a plurality of abutting movable frames provided in correspondence with the plurality of stationary frames and which are interchangeably coupled to the abutting and moving drive mechanism. The image window of each of the abutting movable frames has a first two opposed sides parallel to the direction of advancement of a negative film and a second two opposed sides connected to the first two opposed sides so as to form an obtuse angle therebetween. The second two opposed sides are symmetrical with respect to the direction of advancement of a negative film.

In one preferred embodiment, the window frame is hexagonal with each side of the second two sides including two adjacent edges, arranged so as to form an obtuse angle with ends of the first two opposed sides. The second two sides of the window frames are also symmetrical with respect to the direction of a negative film. Preferably, the angles formed by the sides of the second two sides with respect to a line perpendicular to the direction of advancement of a negative film is in a range of 5 to 15 degrees. In another preferred embodiment, the second two sides are formed arcuately curving outwardly. The abutting movable frame may have an image window frame with each image window frame having two end faces extending in the direction of the width of a negative film and which are tapered with respect to the direction of advancement of a negative film.

DESCRIPTION OF THE PREFERRED EMBODIMENTS

Figure 1:
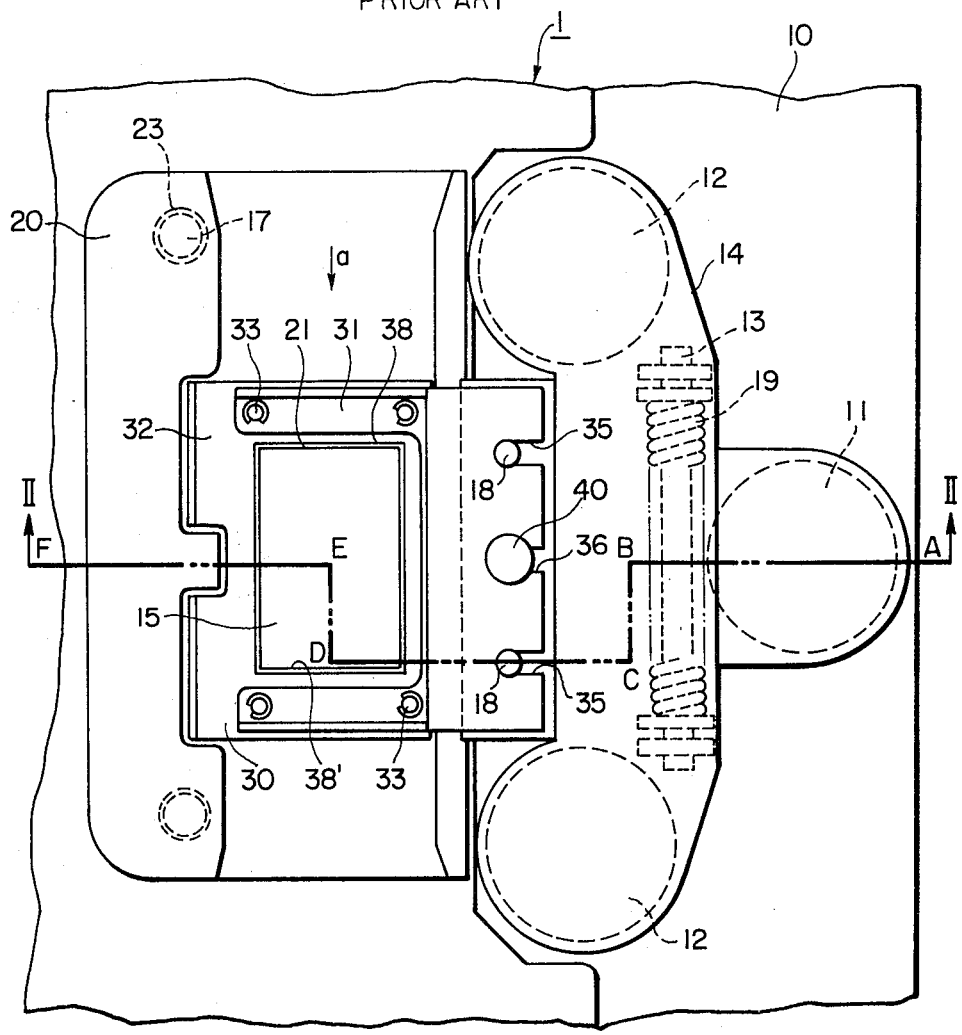
FIG. 1 is a plan view of a conventional negative carrier.
Figure 2:
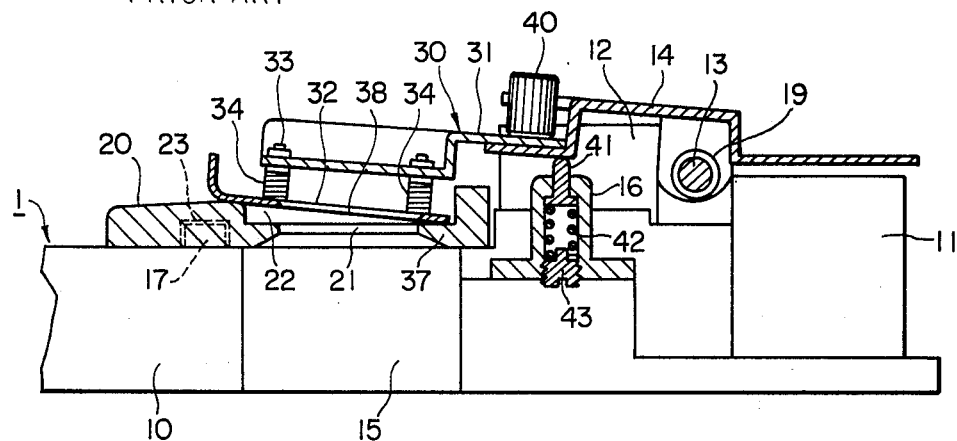
FIG. 2 is a sectional view taken along line II—II in FIG. 1.
Figure 3:
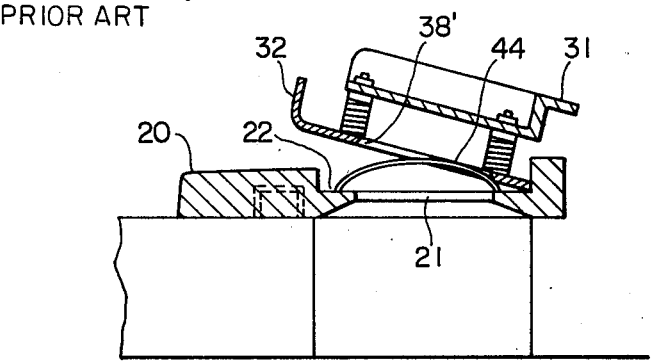
FIG. 3 is a sectional view of a part of the conventional negative carrier showing a segment of negative film caught by the movable frame's image window.
Figure 4:
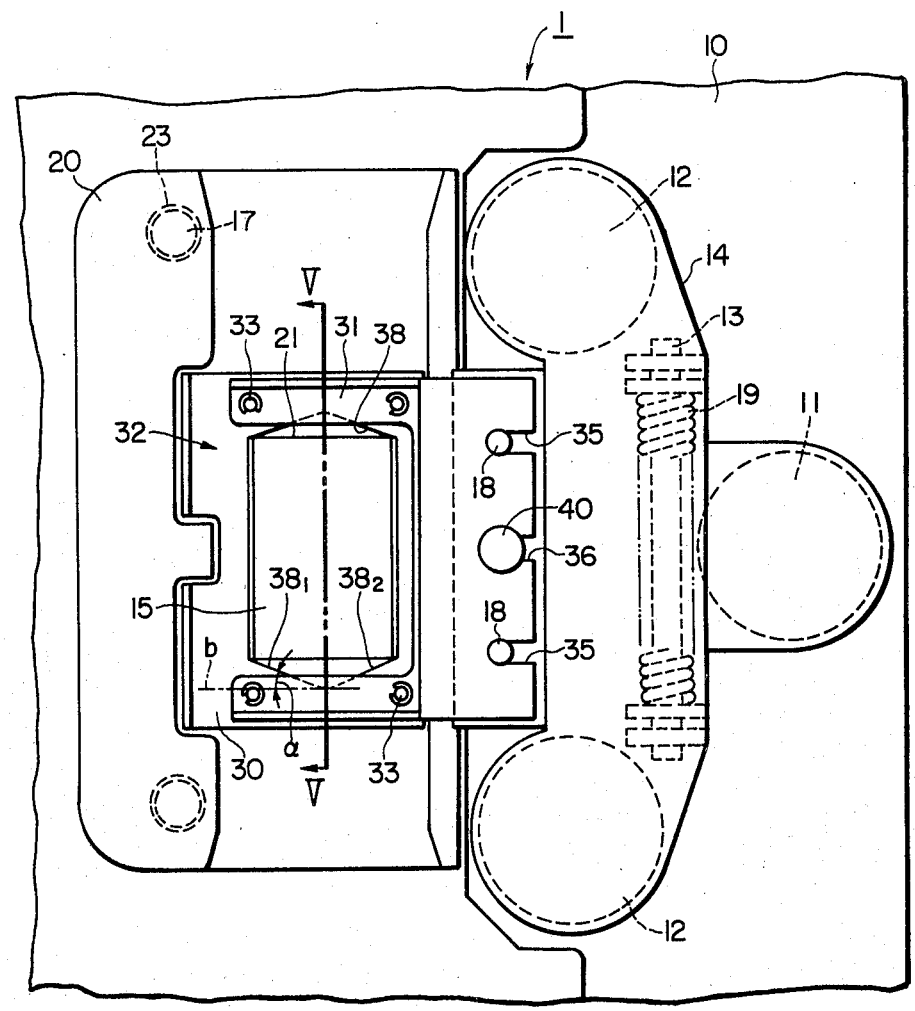
FIG. 4 is a plan view of a first embodiment of a negative film carrier according to the invention.

FIG. 4 is a plan view of a first embodiment of a negative film carrier constructed in accordance with the invention. In FIG. 4, those components which have been previously described with reference to FIG. 1 are therefore similarly numbered. In the negative film carrier shown in FIG. 4, the movable frame 30 has a hexagonal image window 38 whose sides $38_1$ and $38_2$ are not perpendicular to the direction of advancement of a negative film. This is, the sides $38_1$ and $38_2$ of the image window 38 are inclined with respect to the direction of advancement of a negative film. Accordingly, in the negative film carrier of the invention, the end of a segment of arcuately curled negative film cannot be caught by the image window 38 while in the conventional negative film carrier, the end of a segment of arcuately curled negative film will protrude into the window 38 and be caught by the edge 38' of the window. It is desirable to set the angle $\alpha$ formed by each of the sides $38_1$ and $38_2$ and a perpendicular to the direction of advancement of a negative film within a range of 5° to 15°, preferably 10°. In other words, it is desirable to set the angle formed between the sides $38_1$ and $38_2$ to about 160°.

Figure 5:
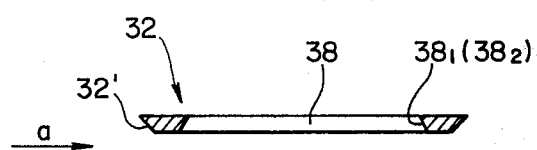
FIG. 5 is a sectional view taken along line V—V in FIG. 4 showing an image window frame.

FIG. 5 is a sectional view taken along line V—V in FIG. 4 showing the image window frame 32. As is apparent from FIG. 5, the end faces, in the film's widthwise direction, of the image window frame 32 are formed tapered surfaces 32' to facilitate the advancement of a negative film in the direction of the arrow a. In addition, the sides $38_1$ and $38_2$ of the frame 38 are also tapered to facilitate the advancement of a negative film. With this structure, even if the end of a segment of negative film is abutted against the tapered surface 32', the negative film will be guided below the frame 38 by the tapered surface 32' as the film is moved forwardly as a result of which the negative film is positively fed between the image window frame 38 and the stationary frame 20. Similarly, when the end of a segment of arcuate negative film is abutted against the sides $38_1$ and $38_2$, the negative film is positively fed between the window frame 38 and the stationary frame 20.

Figure 6:
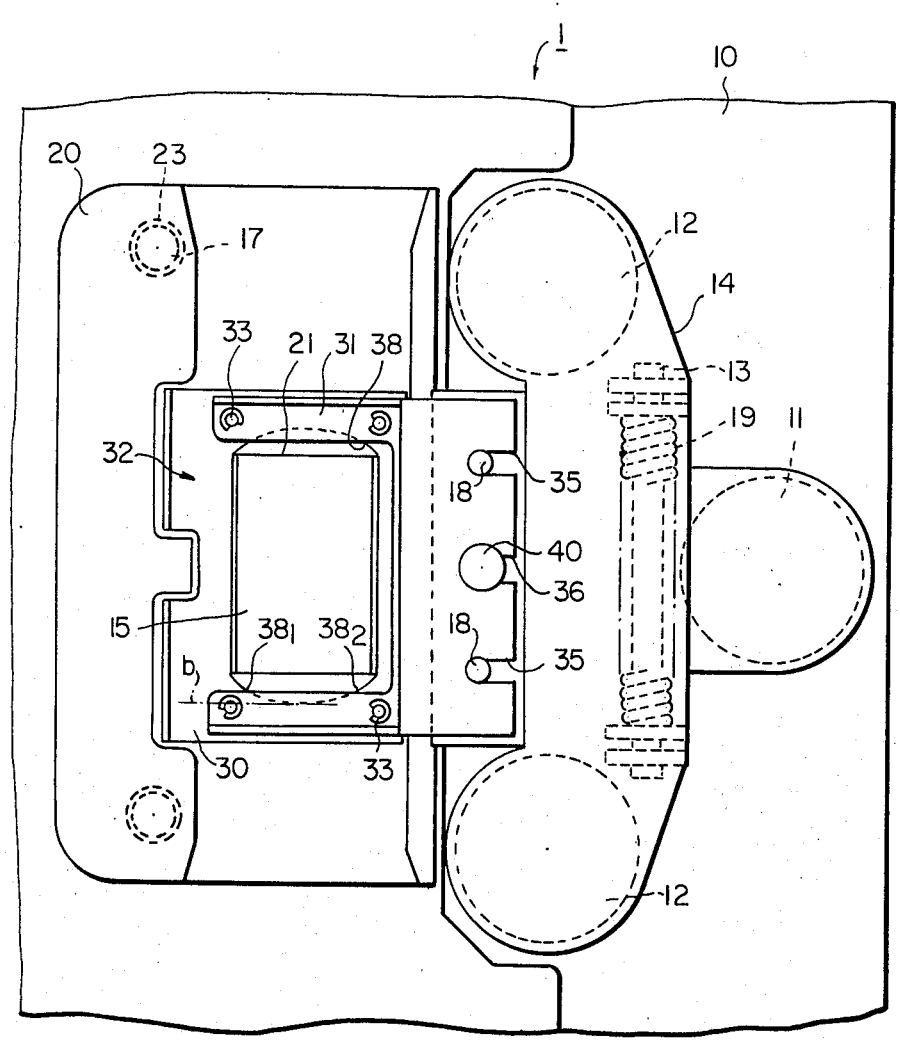
FIG. 6 is a plan view of a second embodiment of a negative film carrier according to the invention.

In the above-described example, the window frame 38 is hexagonal. However, the invention is not limited thereto or thereby. That is, the same effect can be obtained by providing a window frame whose side or edge corresponding to the sides $38_1$ and $38_2$ in FIG. 4 is arcuately curved in the direction of advancement of a negative film as is shown in FIG. 6. That is, all that is necessary for the window frame 38 is to gradually decrease the width, in the film's widthwise direction, of the window frame 38 symmetrically with the direction of advancement of a negative film.

What is claimed is:

1. A negative film carrier for printing pictures comprising: a carrier stand having an abutting and moving drive mechanism adapted to be rocked by solenoid means; a plurality of stationary frames of different image window size, said frames being interchangeably mountable on said carrier stand; a plurality of abutting movable frames provided in correspondence with said plurality of stationary frames which are interchangeably coupled to said abutting and moving drive mechanism, the image window of each of said abutting movable frames having a first two opposed sides parallel to the direction of advancement of a negative film and having a second two opposed sides connecting said first two opposed sides and forming an obtuse angle with ends of said first two opposed sides, said second two sides being symmetrical with respect to the direction of advancement of a negative film.

2. The negative film carrier as claimed in claim 1 wherein said window frame of each of said abutting movable frames is hexagonal with each side of said second two sides comprising two adjacent edges.

3. The negative film carrier as claimed in claim 2 wherein the obtuse angle is between 95 and 105 degrees.

4. The negative film carrier as claimed in claim 1 wherein said second two sides comprise two arcuate sides which are curved outwardly.

5. The negative film carrier as claimed in claim 1 wherein said second two opposed sides and said ends of said first two opposed sides are tapered with respect to the direction of advancement of a negative film.

* * * * *